United States Patent [19]

Bernier

[11] Patent Number: 5,507,158
[45] Date of Patent: Apr. 16, 1996

[54] DEVICE FOR INDIRECT PRODUCTION OF COLD FOR REFRIGERATING MACHINE

[75] Inventor: Jacques Bernier, Houilles, France

[73] Assignee: Elf Aquitaine, France

[21] Appl. No.: 196,224

[22] PCT Filed: Jul. 16, 1993

[86] PCT No.: PCT/FR93/00725

§ 371 Date: Aug. 8, 1994

§ 102(e) Date: Aug. 8, 1994

[87] PCT Pub. No.: WO94/02790

PCT Pub. Date: Feb. 3, 1994

[30]  Foreign Application Priority Data

Jul. 22, 1992 [FR] France .................. 92 09026

[51] Int. Cl.⁶ ..................... F25B 25/00; F25B 17/08
[52] U.S. Cl. .................. 62/482; 62/79; 62/480
[58] Field of Search .................. 62/79, 99, 119, 62/120, 267, 333, 480, 482

[56]  References Cited

U.S. PATENT DOCUMENTS

| | | | |
|---|---|---|---|
| 1,854,778 | 4/1932 | Boving . | |
| 1,855,493 | 4/1932 | Smith . | |
| 1,996,441 | 4/1935 | Smith | 62/118 |
| 2,036,756 | 4/1936 | Hull | 62/116 |
| 2,050,959 | 8/1936 | Normelli | 62/118 |
| 2,068,891 | 1/1937 | Scholl | 62/120 |
| 2,093,725 | 9/1937 | Hull | 165/104.21 |
| 2,293,556 | 8/1942 | Newton | 62/480 |
| 2,310,657 | 2/1943 | Shively | 62/115 |
| 2,499,736 | 3/1950 | Kleen | 165/104.21 |
| 2,512,545 | 6/1950 | Hazard | 62/125 |
| 3,507,322 | 4/1970 | Tetrick et al. | 165/61 |
| 3,603,379 | 9/1971 | Leonard | 165/2 |
| 4,295,342 | 10/1981 | Parro | 62/119 |
| 4,640,347 | 2/1987 | Grover et al. | 165/104.26 |
| 4,713,944 | 12/1987 | Januschkowetz | 62/480 |
| 4,765,395 | 8/1988 | Paeye et al. | 165/104 |
| 5,005,371 | 4/1991 | Yonezawa et al. | 62/238.6 |
| 5,159,972 | 11/1992 | Gunnerson et al. | 165/32 |

FOREIGN PATENT DOCUMENTS 0202662  5/1986  European Pat. Off. .

Primary Examiner—Henry A. Bennett
Assistant Examiner—William C. Doerrler
Attorney, Agent, or Firm—Bacon & Thomas

[57]  ABSTRACT

A device for indirect cold production for a compression, absorption, adsorption or chemical refrigerating system comprises an evaporator in heat exchange relationship with the fluid to be cooled in one or more condensers, themselves in direct heat exchange relationship with the evaporator or the refrigeration circuit reactor, circulation between the evaporator and the condenser being established by gravity flow using a phase change fluid and separate vapour and liquid pipes.

4 Claims, 4 Drawing Sheets

DEVICE FOR INDIRECT PRODUCTION OF COLD FOR REFRIGERATING MACHINE

TECHNICAL FIELD OF THE INVENTION

The subject of the invention is a device for indirect production of cold for refrigerating machine.

BACKGROUND OF THE INVENTION

Solid/gas chemical heat pump installations are already known which make use of the phenomena of adsorption or absorption. Compression refrigerating machines are likewise known which also use ammonia as the refrigerant fluid. These machines have, however, a number of drawbacks such as the risks of serious accidents in the event of corrosion of the exchangers, when the ammonia is then released into the surroundings. The difficulties posed by the ammonia pressure reduction members in chemical refrigerating machines are also known. Moreover, indirect systems for producing cold generally require auxiliary pumps to transfer the fluids, and relatively complex regulating devices. Such installations are not however entirely satisfactory because they lead to higher costs, and entail additional energy consumption whilst making regulation complicated.

SUMMARY OF THE INVENTION

A general object of the invention is to provide an installation which does not have the abovementioned drawbacks of the known installations.

A particular object of the invention is to provide an installation in which the heat transfers at the cold source and at the heat source are effected by means of an intermediate transfer device using a superposed heat pipe, that is to say a heat syphon with liquid/vapour phase change.

Another object of the invention is to provide an installation with solid/gas chemical reaction or with adsorption, in which the pressure reduction member is eliminated.

A further object of the invention is to provide an installation for producing cold by compression, in which the fluid for transfer at the exchangers onto external fluids is different from that used by the refrigerating compressor, thus making it possible to use $NH_3$ compressors, and to have available an economizer device used when the temperature of the external fluid on the condenser side is less than that on the evaporator side.

The invention will be clearly understood from the following description which is given by way of example and with reference to the attached drawings,

DETAILED DESCRIPTION OF THE INVENTION

Figure 1:
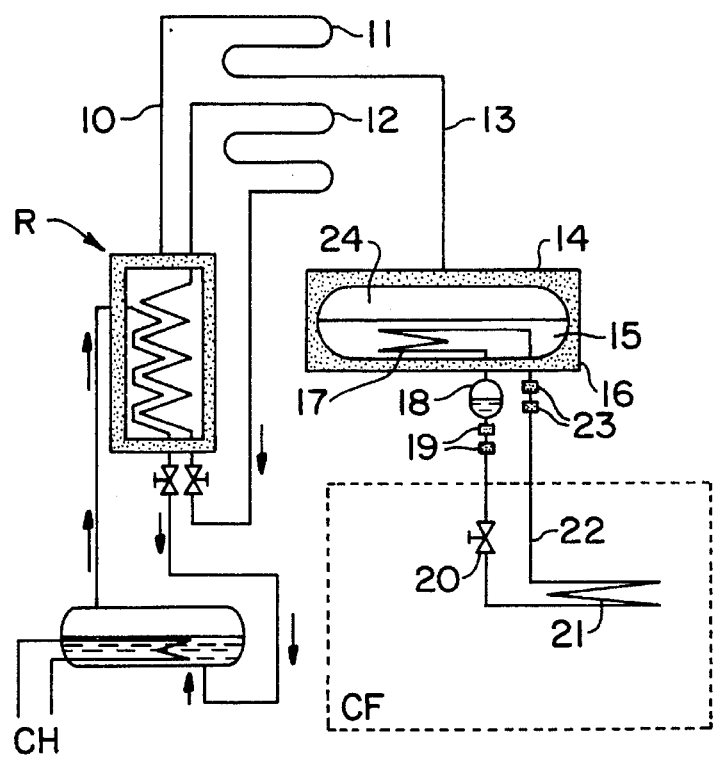
FIG. 1 is a circuit diagram of an installation according to the invention

A device for indirect production of cold, according to the invention, FIG. 1, includes an evaporator 21 which cools an enclosure CF, the said evaporator forming part of a closed refrigerating circuit independent of the refrigerating circuit of the solid/gas machine. A condenser 17 is placed in the reservoir 14 containing the liquid 15. This reservoir is thermally insulated on the outside (or inside) by an insulating material 16, and is in contact with the chemical reactor R via a pipeline 10, a condenser 11, and a pipeline 13. In the synthesis phase of the reactor, the liquid 15 ($NH_3$) vaporizes because of the heat supplied at low temperature by the condenser 17. The vapour 24 formed is then sucked in by the reactor R. During this phase, the intermediate fluid which condenses in 17 is directed into the reservoir 18 then enters the evaporator 21 under gravity, passing through the regulating valve 20 whose function is to regulate the temperature of the refrigerated enclosure CF. The intermediate fluid (for example an HFC) vaporizes in 21 while cooling CF, the vapour then passes through the pipeline 22 and is directed towards the upper part of the condenser 17. The intermediate fluid is circulated by gravity because of the difference in density between the liquid and the vapour. Self-closing or cappable connectors 19 and 23 allow easy assembly and disassembly of the whole. In this system, no pressure reduction device is necessary, because the liquid 15 vaporizes partially at the start of the synthesis phase of the reactor; the circulation of the intermediate fluid can arise only if the temperature of the liquid 15 is less than that of the enclosure CF to be cooled (thermal diode effect). In the regeneration phase of the reactor R, the latter is heated by a heating means CH which has the effect of desorbing the gas of the reactor, the vapour then condenses in the condenser 11 and the liquid formed falls back into the reservoir 14. During the regeneration phase, there is no heat transfer at the exchanger 17, and therefore no production of cold, and the use of two independent reactor R/condenser 11/reservoir 14/condenser 17 assemblies can therefore be envisaged, in which the condensers 17 are connected in parallel in order to provide continuous production of cold at the evaporator 21 (similar connections to those in FIG. 8.)

Figure 2:
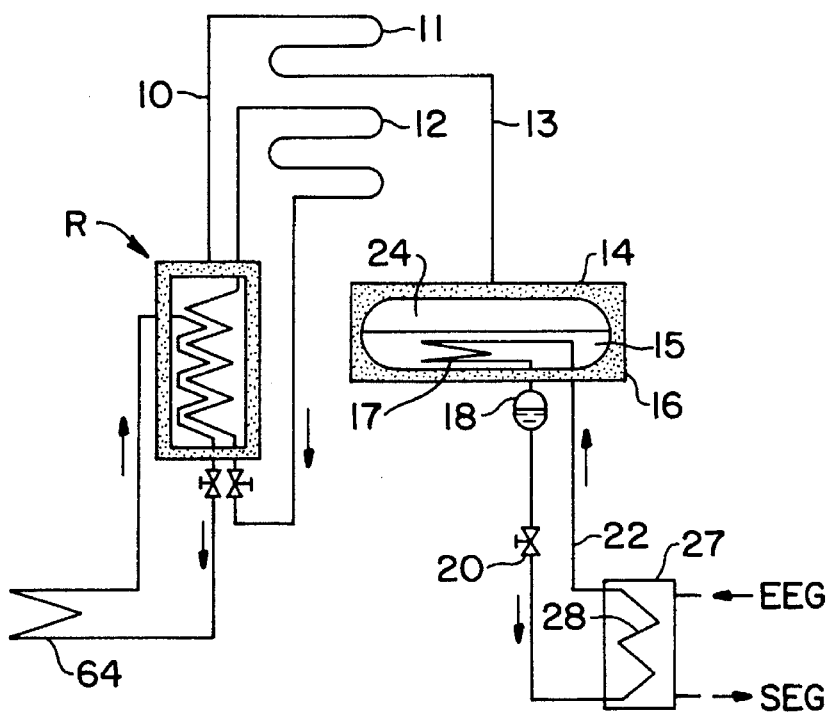
FIG. 2 is a variant with a water evaporator

FIG. 2 represents a variant of the invention in which the cold is produced by a water evaporator 27 including an exchanger 28 performing the same function as the evaporator 21 in FIG. 1.

Figure 3:
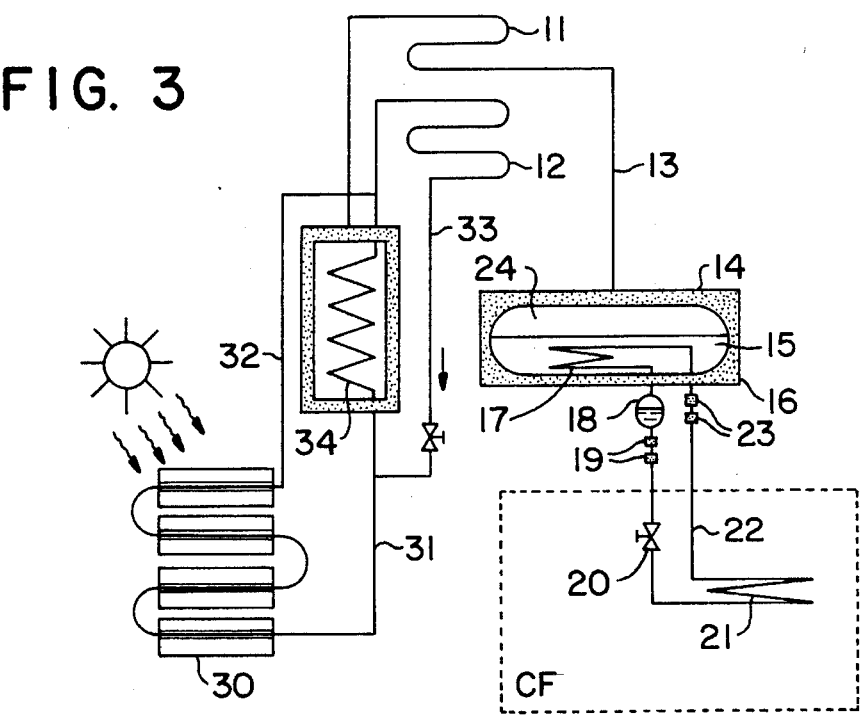
FIG. 3 is a variant in cold production by solid/gas machine functioning with solar energy

FIG. 3 is a variant embodiment for the application in production of cold from a solar energy source. The exchanger of the reactor R might also be double, as in FIG. 2.

Figure 4:
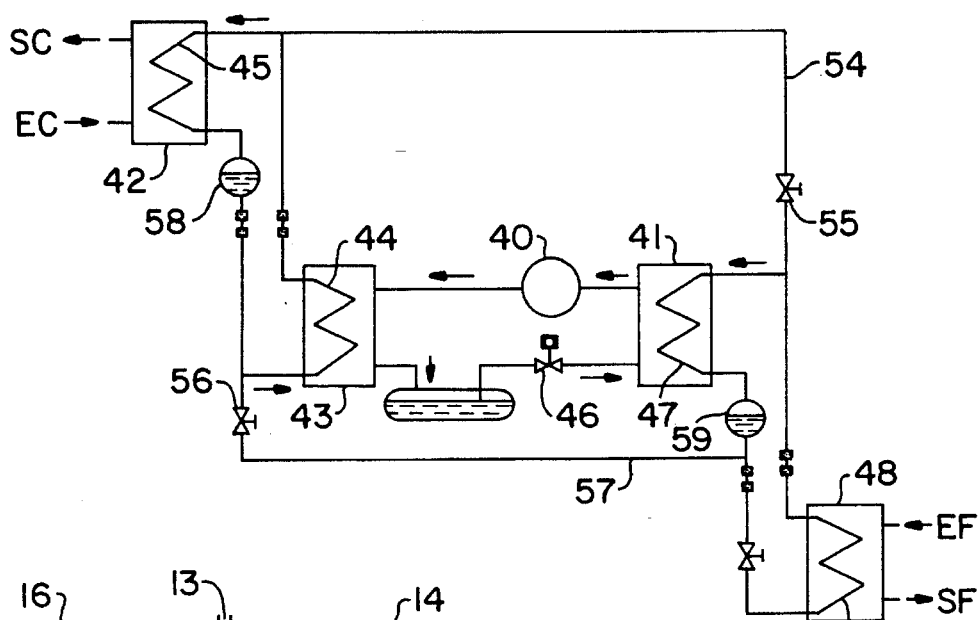
FIG. 4 is a variant for compression systems

FIG. 4 represents the application of the device according to the invention to an installation for producing cold by compression. A conventional refrigerating circuit includes a compressor 40, a condenser 43, a pressure reducer 46, and an evaporator 41. The fluid to be cooled enters at EF and leaves at SF from the intermediate evaporator 48. The latter comprises an exchanger 49 in which the intermediate fluid, which will then condense in the exchanger 47, evaporates, the liquid formed is stored in the reserve 59 and then returns into 49. In the same way, a similar circuit is placed on the circuit of the condenser 43 with a condenser 42, a reserve 58 and an exchanger 44. An economizer device consisting of the pipelines 57 and 54 as well as the valves 55 and 56 makes it possible to provide cooling at the evaporator 48 when the temperature of the external fluid EF is greater than that of the external fluid EC, without operating the compressor 40.

Figure 5:
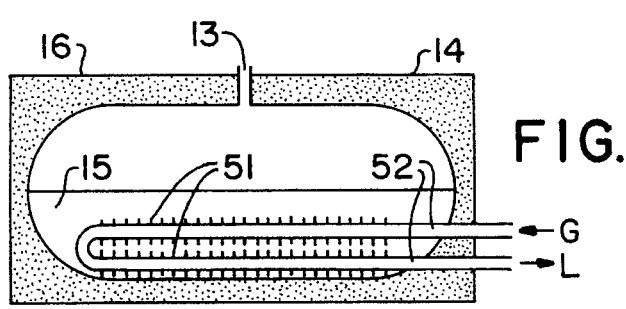
FIG. 5 is a sectional view of a component of the invention

FIG. 5 represents a detail of the reservoir in FIG. 1 according to the invention. The exchanger 17 (FIG. 1) consists of horizontal tubes 52 lined with fins 51 (or pins, as in the case of pin-fin exchangers). The exchanger is placed at the bottom part of the reservoir 14 so that it is always bathed in the liquid 15. The phase-change intermediate transfer fluid enters at G in the upper part of the exchanger, and reemerges liquid at L.

Figure 6:
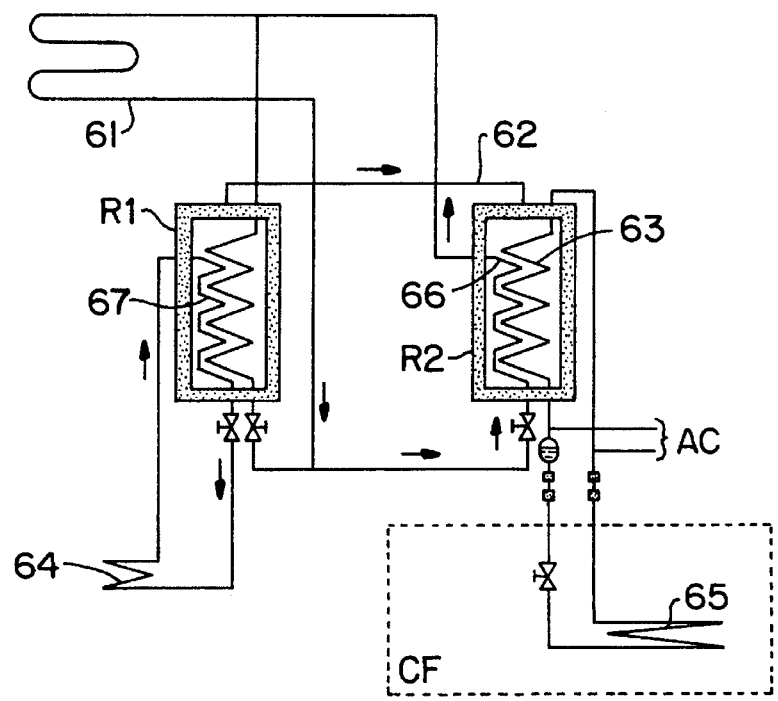
FIG. 6 is a variant of the invention for a chemical reaction machine including two salts

FIG. 6 represents an example of application of the invention in a chemical refrigerating machine with two salts. The cold produced at the exchanger 65 is used as the regeneration heat for the reactor R2. A second circuit AC including two other reactors like those of the first circuit will allow continuous production of cold at the evaporator 65.

Figure 7:
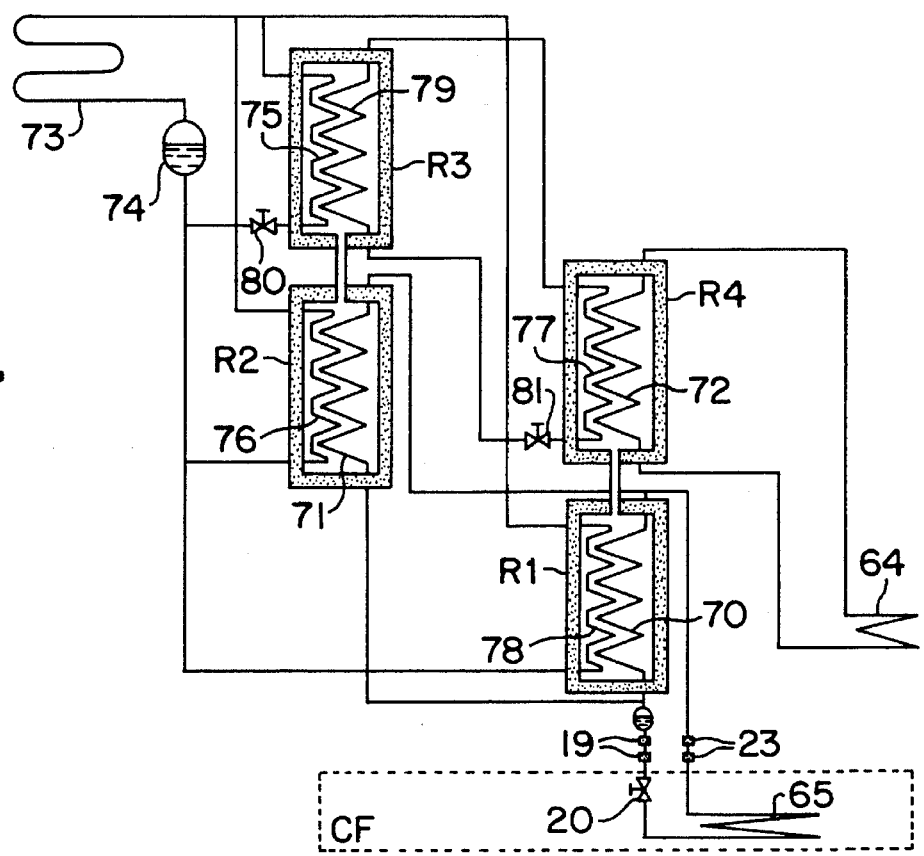
FIG. 7 is a variant of the invention for a chemical-reaction refrigerating machine including three salts, as described for example in Patent Application Lebrun/Mauran/Spirmer No. 8913913

FIG. 7 represents an example of application of the invention for a chemical refrigerating machine circuit with three salts. The evaporator 65 produces cold continuously, while providing successive regeneration of the reactors R1 and R2 which contain a salt with a low level of regeneration temperature, such as $BaCl_2/NH_3$. In the regeneration phase of R4 (which contains a salt such as $NiCl_2/NH_3$), the heating exchanger 64 transfers its heat to the exchanger 72 which therefore desorbs R4 to R1. The cold produced in CF by vaporization of the intermediate fluid will regenerate the reactor R2 which will then desorb to R3. The heat of reaction of the reactors R1 and R3 will be removed according to the same principle into the condenser 73 after the valve 80 is opened. In the regeneration phase of R3, (which contains a salt such as $ZnCl_2/NH_3$) from the heat of reaction of R4 following the opening of the valve 81, the reactor R1 is regenerated from the production of cold in 65. The heat of reaction of the reactor R2 is removed to the condenser 73, and the exchanger 71 is then superheated with respect to the liquid/vapour temperature equilibrium of the intermediate cold production fluid, thereby preventing any circulation between 71 and 65. Similarly, in the first phase described previously, it was the exchanger 70 which was superheated, then stopping any circulation between 70 and 65. The positioning of the pipelines supplying the exchangers 70 and 71 will be such that heat transfer from one exchanger to another will be made impossible.

Figure 8:
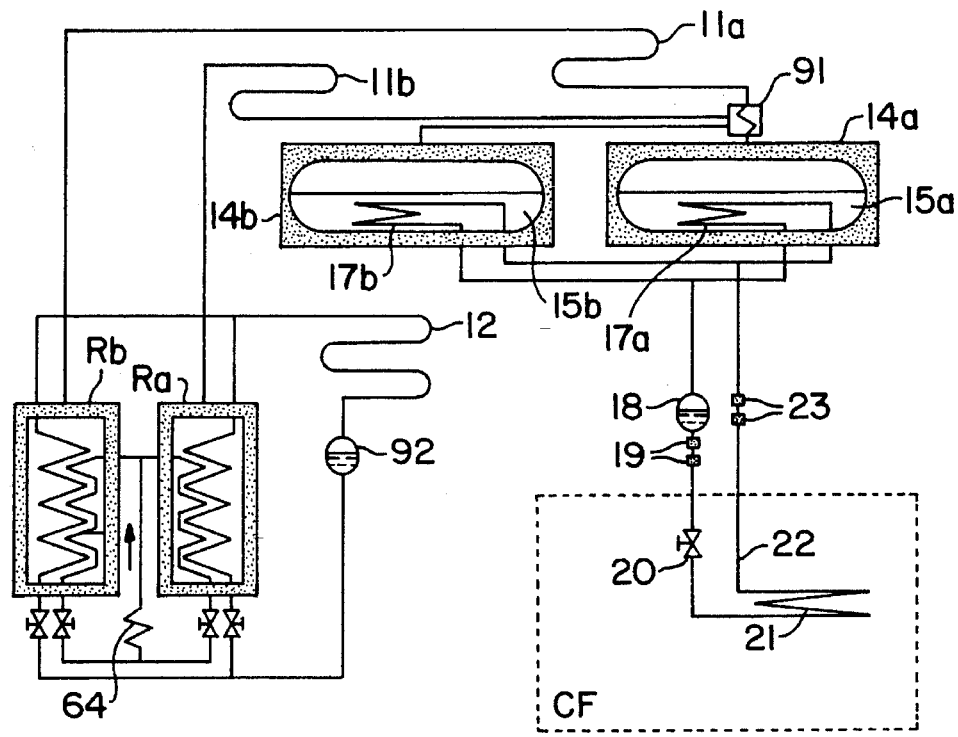
FIG. 8 is a variant of FIG. 1 for an installation including two reactors, allowing continuous operation

FIG. 8 represents a variant of FIG. 1, in which the installation includes two independent chemical reactor circuits Ra and Rb, each including its own condenser 11a and 11b and its own reservoir 14a and 14b. The two reactors are regenerated alternately by the heating means 64. The two reactors make use of a common cooler 12. A super cooling exchanger 91 makes it possible to cool the liquid leaving a condenser using the cold vapours leaving the reservoir of the other circuit. The two exchangers 17a and 17b make it possible to transmit the cold from the reservoir to the evaporator 21, the thermal diode effect preventing transfer if one of the reactor circuits is in the regeneration phase.

Figure 9:
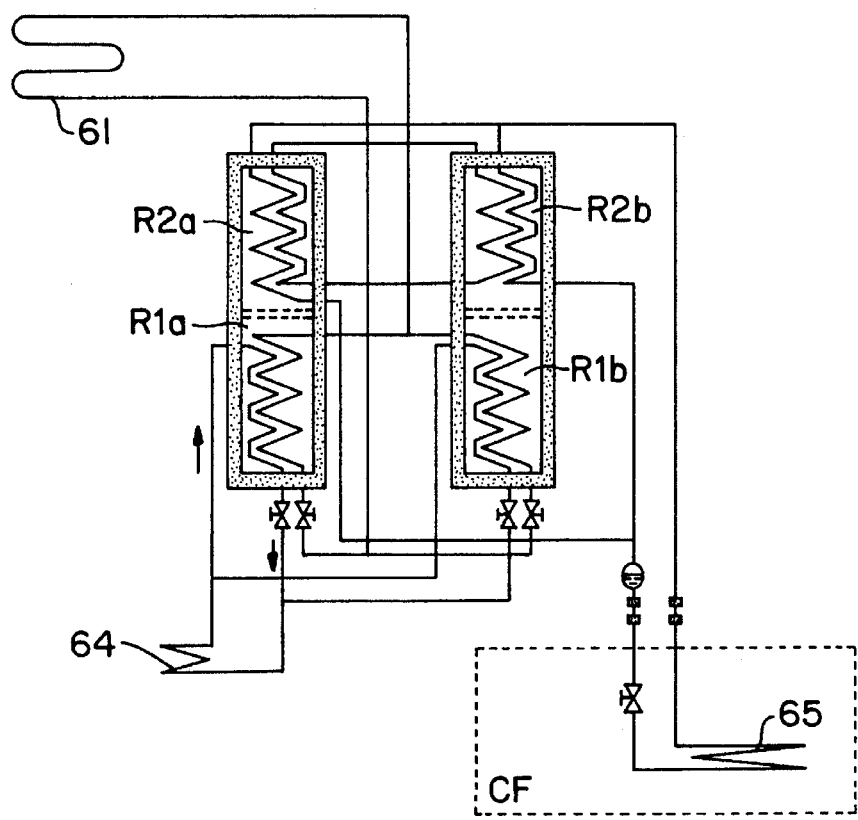
FIG. 9 is a variant of FIG. 6 for an installation with two salts and continuous operation.

FIG. 9 represents a variant of FIG. 6 which makes it possible to produce cold continuously for an installation with two salts. The reactors R1 and R2 are combined in the same body in this figure, i.e. respectively R1a/R2a and R1b/R2b. The same cooler 61 removes the heat released during chemical reactions by the same superposed heat-pipe process. The alternate heating of the two reactors is produced by the exchanger 64 which may be either a boiler or any other source of heat at a sufficient temperature.

The regulating valve 20 represented in FIGS. 1 to 9 may be either a thermostatic valve controlling the temperature of the ambient cold medium, or a pressure-sensitive valve closing the circuit if its pressure falls below a threshold, or alternatively an electromagnetic valve controlled by the temperature of the medium to be cooled, for example.

The invention is obviously not limited to the production of cold by a thermochemical machine, but may also be applied to adsorption machines which use for example zeolite/water or active carbon/methanol pairings, as well as to refrigerating machines with compression or with absorption such as $NH_3/H_2O$ (in this case, the compression circuit as represented in FIG. 4 is replaced by an absorption circuit).

The invention is in particular applicable to the cooling of refrigerating lorries, to air-conditioning of all types of motor vehicles, to heating, to the production of hot water, to the solar production of cold, to iced-water plants.

The air exchangers may use natural convection or forced circulation aided by a fan.

I claim:

1. A heat transfer system for indirect cooling of a fluid medium comprising:
   a first, closed heat transfer circuit including:
      an evaporator unit in direct heat-exchange communication with a fluid medium to be cooled, said evaporator unit having an inlet and an outlet for the flow of refrigerant;
      a first condenser unit having an inlet and an outlet, the inlet of said first condenser unit being in fluid communication with the outlet of said evaporator unit;
      a first reservoir unit in direct fluid communication with the outlet of said first condenser unit for receiving liquid refrigerant from said first condenser unit, said first reservoir unit being in further fluid communication with the inlet of said evaporator unit for supplying refrigerant thereto;
      valve means interposed between said first reservoir unit and said evaporator unit for regulating the supply of refrigerant from said first reservoir unit to said evaporator unit;
   a second, closed heat transfer circuit including:
      a reactor unit incorporating a heat exchanger having an inlet and an outlet;
      a second condenser unit having an inlet in fluid communication with the outlet of the heat exchanger of said reactor unit and an outlet in fluid communication with the inlet of said heat exchanger;
      valve means interposed between the outlet of said second condenser unit and the inlet of said heat exchanger;
   a second reservoir unit encapsulating said first condenser unit, said second reservoir unit defining a liquid zone containing a liquid within which said first condenser unit is located and a vapor zone above said liquid zone; and
   a third condenser unit in fluid communication with the vapor zone of said second reservoir unit through a first pipeline and with the reactor unit through a second pipeline said third condenser unit being disposed above said second reservoir unit so that liquid formed in said third condenser unit falls back into said second reservoir unit and said third condenser unit being independent of said second condenser unit so that no heat is transferred between said second and third condenser units.

2. A heat transfer system according to claim 1, further comprising a third heat transfer circuit including a heat source means having an outlet leading a fourth condenser unit arranged in heat-exchange relationship with the heat exchanger of said reactor unit and a regulating valve arranged in a pipeline interconnecting an output of said heat exchanger and an inlet of said heat source means.

3. A heat transfer system according to claim 1, further comprising means for thermally insulating said second reservoir unit.

4. A heat transfer system according to claim 1, wherein said first heat transfer circuit is arranged with said evaporator unit being located below said first condenser unit such that liquid refrigerant flows from said first condenser unit, through said first reservoir unit and said valve means, to said evaporator unit due to gravity.

* * * * *